US008866066B2

(12) United States Patent
Fuse

(10) Patent No.: US 8,866,066 B2
(45) Date of Patent: Oct. 21, 2014

(54) LOCK SYSTEM

(75) Inventor: Kenichi Fuse, Hadano (JP)

(73) Assignee: Empire Technology Development LLC, Wilmington, DE (US)

( * ) Notice: Subject to any disclaimer, the term of this patent is extended or adjusted under 35 U.S.C. 154(b) by 762 days.

(21) Appl. No.: 13/062,496

(22) PCT Filed: Oct. 20, 2010

(86) PCT No.: PCT/US2010/053399

§ 371 (c)(1),
(2), (4) Date: Mar. 4, 2011

(87) PCT Pub. No.: WO2012/054031

PCT Pub. Date: Apr. 26, 2012

(65) Prior Publication Data

US 2012/0096908 A1 Apr. 26, 2012

(51) Int. Cl.
*G01D 5/34* (2006.01)
*E05B 49/00* (2006.01)
*G07C 9/00* (2006.01)

(52) U.S. Cl.
CPC .... *E05B 49/006* (2013.01); *G07C 2009/00785* (2013.01); *G07C 9/00309* (2013.01)
USPC ..... 250/231.1; 70/278.2; 70/278.3; 70/283.1; 70/284; 340/542; 365/147

(58) Field of Classification Search
CPC ..... E05B 51/00; E05B 47/0012; E05B 51/02; E05B 49/006; B65D 2211/00; G09F 3/0376; G07C 9/00309; G07C 2009/00785
USPC ........... 250/231; 70/278.2, 278.3, 283.1, 284; 340/542; 385/147
See application file for complete search history.

(56) References Cited

U.S. PATENT DOCUMENTS

| | | | | | |
|---|---|---|---|---|---|
| 4,369,481 | A | | 1/1983 | Early | |
| 4,453,390 | A | * | 6/1984 | Moritz et al. | 340/542 |
| 4,546,345 | A | * | 10/1985 | Naito | 340/542 |
| 5,206,521 | A | | 4/1993 | Ruiz et al. | |
| 5,543,665 | A | | 8/1996 | Demarco | |
| 5,633,975 | A | | 5/1997 | Gary et al. | |

(Continued)

FOREIGN PATENT DOCUMENTS

| | | | | | |
|---|---|---|---|---|---|
| EP | 0034230 | A1 | | 8/1981 | |
| JP | 05311932 | A | * | 11/1993 | E05B 51/00 |

(Continued)

OTHER PUBLICATIONS

International Search Report and Written Opinion for International Patent Application No. PCT/US2010/053399 mailed on Jan. 5, 2011.

*Primary Examiner* — Georgia Y Epps
*Assistant Examiner* — Kevin Wyatt
(74) *Attorney, Agent, or Firm* — Maschoff Brennan

(57) ABSTRACT

Techniques are generally described for a lock system. An example lock system includes a lock with a lock module that controls a lock mechanism. The lock is configured to transmit optical signals to a key. The key reflects the optical signals back to the lock. The key is configured to encode the optical signals with a combination. The lock module is configured to determine whether the combination is valid. The lock module actuates the locking mechanism when the key is determined to be valid.

20 Claims, 4 Drawing Sheets

(56) References Cited

U.S. PATENT DOCUMENTS

| | | | | |
|---|---|---|---|---|
| 5,745,045 | A * | 4/1998 | Kulha et al. | 340/5.2 |
| 5,838,232 | A * | 11/1998 | Kim et al. | 340/542 |
| 6,420,971 | B1 * | 7/2002 | Leck et al. | 340/542 |
| 7,138,903 | B2 * | 11/2006 | Doong et al. | 340/5.6 |
| 2005/0259411 | A1 * | 11/2005 | Chen et al. | 362/116 |
| 2006/0228069 | A1 * | 10/2006 | Gulvin et al. | 385/16 |
| 2012/0304713 | A1 * | 12/2012 | Chien et al. | 70/276 |

FOREIGN PATENT DOCUMENTS

| | | | |
|---|---|---|---|
| JP | 2003120088 | A | 4/2003 |
| JP | 2004190455 | A | 7/2004 |
| JP | 2009155953 | A | 7/2009 |
| WO | 9709209 | A2 | 3/1997 |

* cited by examiner

LOCK SYSTEM

BACKGROUND

Unless otherwise indicated herein, the materials described in this section are not prior art to the claims in this application and are not admitted to be prior art by inclusion in this section.

Locks have been in use for many years and for many different reasons. Protecting property and preventing crime are examples of situations where locks are used. While locks can provide some protection, locks are not always foolproof. As a result, the present disclosure appreciates that there is a need to continue to develop increasingly secure locks that are harder to pick or circumvent.

Generally, a lock is a device that can be opened or closed with a complementary object such as a key. When a lock is purchased, it comes with a key that is configured specifically for the accompanying lock. In order to provide security, the key is specially configured to fit in the lock and operate a locking mechanism in the lock. The key and lock pair often have corresponding mechanical features than allow the key to be inserted into the lock and that allow the key to mechanically operate the lock mechanism.

Locking mechanisms are often mechanical in nature. For example, the locking mechanism in a conventional pin tumbler lock operates using pins of varying lengths that cooperate with a plug. Rotation of the plug is needed to open the lock. Before the key is inserted into the plug, the pins are typically biased or positioned such that the pins block or prevent rotation of the plug. As a result, the lock cannot be opened without the appropriate key. Insertion of the paired key into the lock's plug aligns the pins in a particular way that allows the plug to rotate. In this case, the key is typically configured such that when the key is inserted into the lock, the key aligns the pins. Once the pins are aligned the key can be used to rotate the plug and open the lock.

Although conventional mechanical locks generally provide a measure of security, they are not completely secure. Many types of conventional locks can be picked or actuated without the key for various reasons. Mechanical lock systems, for instance, often experience wear, have physical intolerances, or have other characteristics that can make a lock susceptible to being picked. A metal jig, for instance, can be used to release a lock mechanism and turn the lock. Although the jig is obviously more difficult to use than the actual key, the jig can nonetheless be used to open the lock. As a result, the ability of the lock to protect property from damage or theft may be reduced.

Some lock-and-key mechanisms use magnetic keys. These magnetic keys can store a signature that can be read by a card reader. When the card is swiped through the card reader or held near the card reader, the key is read and, if the stored data in the key card is verified, the lock is actuated. Unfortunately, there is a risk that the card can be falsified intentionally or compromised.

SUMMARY

Embodiments of the disclosure generally relate to lock systems. In one embodiment, a lock system includes a lock. The lock can include a lock module that is configured to control a lock mechanism. The lock module can include a source that is configured to transmit optical signals to a key. A detector included in the lock module can be configured to detect encoded optical signals returned from the key. A control module in the lock module can be configured to read the encoded optical signals and determine whether the key is valid. The control module can also be configured to actuate the lock mechanism when the key is determined to be valid.

In another embodiment, the lock system can include a lock that is paired with a key. The lock can include a source that is configured to emit optical signals toward the key through a waveguide when the key is engaged with the lock. A detector in the lock system can be configured to detect encoded optical signals returned from the key. The key can be configured to encode the optical signals with a combination and a control module in the lock system can be configured to selectively engage or disengage a locking mechanism when the control module determines that the combination is valid. The key can include a waveguide. The waveguide included in the key can be configured to receive the optical signals from the waveguide in the lock and encode the optical signals by reflecting a portion of the optical signals.

In another embodiment, a method of actuating a lock mechanism in a lock system is described. Optical emitters included in a lock module can be configured to emit optical signals. The optical signals are emitted into waveguides. One or more of the waveguides have a reflective element and one or more of the waveguides have a feature configured to prevent one or more of the optical signals from being reflected. The reflected optical signals can be adapted to include a combination that can be received and detected by one or more detectors. The method can determine a validity of the key when the combination is verified. The method can then actuate the lock mechanism when the key is determined to be valid.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
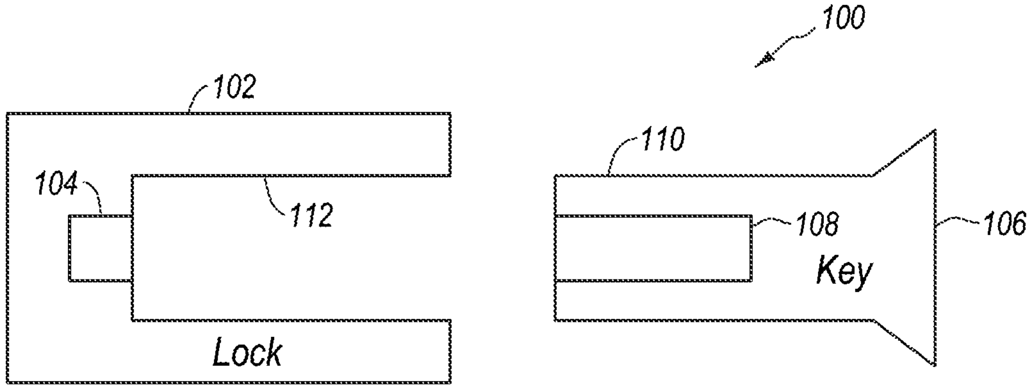
FIG. 1A shows an illustrative example of a lock system including a lock and a key.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments relate to a lock system. The lock system generally includes a lock and at least one key. The lock is typically paired to the key, although embodiments of the lock system can be configured or reconfigured to accept multiple keys. Examples of the lock system disclosed herein determine the validity of a key using signals such as optical signals.

During operation, the lock system generates optical signals (e.g., light) that are conveyed from the lock to the key via waveguides or optical paths. The key also include waveguides or optical paths that enable the key to return the optical signals received from the lock back to the lock. The key operates on the optical signals either actively or passively such that the optical signals returned by the key include a combination that can be read by the lock. The lock is equipped to recognize the combination in the optical signals returned by the key. If the combination read from the key is correct, the key is validated and the lock is actuated.

Figure 1B:
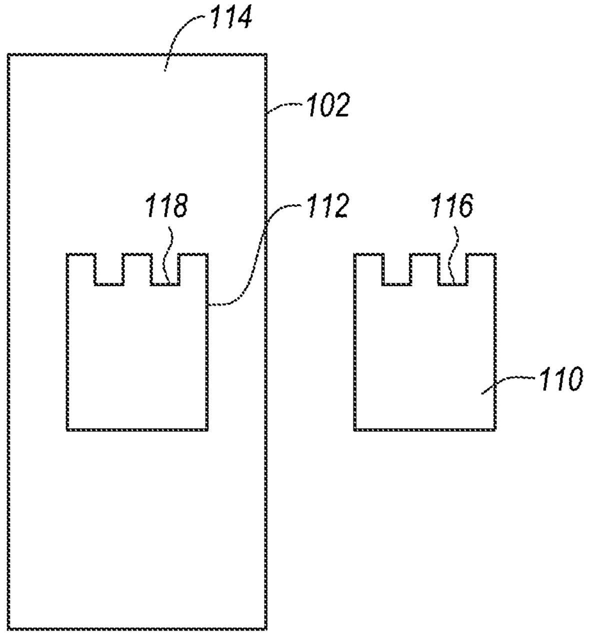
FIG. 1B shows an illustrative example of the key and a keyhole in the lock configured to receive the key.

FIG. 1A shows an illustrative example of a lock system 100 arranged in accordance with at least some embodiments described herein. The lock system 100 includes a lock 102 and a key 106. FIG. 1B shows an illustrative example of a distal end 110 of the key 106 and a keyhole 112 in the lock configured to receive at least the distal end 110 of the key 106, in accordance with at least some embodiments described herein.

With reference to FIGS. 1A and 1B, the lock 102 and the key 106 may have complementary structures allowing the lock 106 to receive the key 106 in a keyhole 112. In this example, at least the distal end 110 of the key 106 is received in the keyhole 112 of the lock 102. In some instances, the key 106 may be placed adjacent or simply in contact with a portion of the lock 102.

The lock 102 may include a detection mechanism that recognizes when the key 106 is inserted into the keyhole 112. Once the key 106 is received by or inserted into the lock 102, the lock 102 can be actuated to either open and/or close the lock 102. For instance, insertion of the key 106 changes a current state of the lock 102 when the key 106 is valid. More specifically, when the key is valid, insertion of the key 106 opens the lock 102 when the lock is closed or locks the lock 102 when the lock 102 is open. In some examples, the key 102 can be rotated or otherwise manipulated to open or close the lock 102, although this is not required.

The lock system 100 may include electrical and/or optical components. When the key 106 is inserted in the lock 102 (e.g., in the keyhole 112), the lock 102 is able to establish an optical and/or electrical connection with the key 106. The electrical and/or optical connection can be used to determine the validity of the key 106. The lock 102 communicates optically and/or electrically with the key 106 to determine the validity of the key 106.

The lock 102 includes a lock module 104 that governs or controls the optical communication with the key 106. Specifically, the lock module 104 is configured to interface with a key module 108 included in the key 106 when the key 106 interfaces with the lock 102. The lock module 104 interfaces with the key module 108 when the key 106 is inserted into the keyhole 112 to determine the validity of the key 106. When the lock module 104 determines the key 106 to be valid, the lock module 104 sends an instruction to a lock drive component 208 to open or close the lock 102. The lock drive component 208 drives or actuates a lock mechanism (e.g., a bolt lock, a magnetic lock, etc.).

During operation, the lock module 104 generates signals, such as optical signals, that are transmitted to the key module 108. The key module 108 returns the signals back to the lock module 104. The lock module 104 can determine the validity of the key module 106 based on the returned signals. The key module 108 may be configured to alter or operate on the transmitted signals such that the signals returned to the lock module 104 are different from the signals initially transmitted by the lock module 104. The key module 108 changes the transmitted signals in a way that enables the lock module 104 to determine the validity of the key 106.

FIG. 1B further illustrates a face 114 of the lock 102. The keyhole 112 is disposed or located in the face 114 of the lock. For example, the lock 102 may be used on a door and the face 114 is the portion of the lock 102 that is exposed to a user when opening or closing the lock 102. The unexposed portion of the lock 102 may be inside the door or mounted on an opposite side of the door.

At least the end 110 of the key 106 and the keyhole 112 have complementary structures. In one example, the end 110 of the key 106 may have grooves and/or ridges that are arranged to align with corresponding ridges and/or grooves formed in walls of the keyhole 112. These complementary structures on the end 110 of the key 106 and the keyhole 112 may ensure that the key 106 is inserted into the lock 102 in a specific orientation. FIG. 1B illustrates that the key may include grooves 116 that are arranged to engage with the ridges 118 in the keyhole 112. The grooves 116 and the ridges 118 ensure that the key 106 is properly oriented when the key 106 engages the lock 102. If the key 106 is not oriented correctly, an otherwise valid key may be rejected as invalid in some instances. The complementary structures ensure that the key 106 is properly oriented with respect to the lock 102 when actuating the lock 102.

One of skill in the art can appreciate that the configuration of the keyhole 112 and/or the key 106 can vary widely. For example, the shape of the keyhole 112 and/or the end 110 of the key 106 can be generally square, round, hexagonal, or other configuration and include grooves, ridges, or other structure in various orientations. Generally, the keyhole 112 and the key 106 have complementary structures that allow the key 106 to engage the lock 102. In some examples, the key 106 may not have a keyhole and the key 106 may be placed in contact with or near a particular portion of the face 114.

The security of the lock system 100 includes the signals transmitted from the lock 102 to the key 106. However, the security of the lock system 100 can be enhanced with mechanical features on the key 106. For example, the lock system 100 may also require physical rotation, which can be achieved by the proper mechanical configuration of the key 106 and the keyhole 112.

Figure 2:
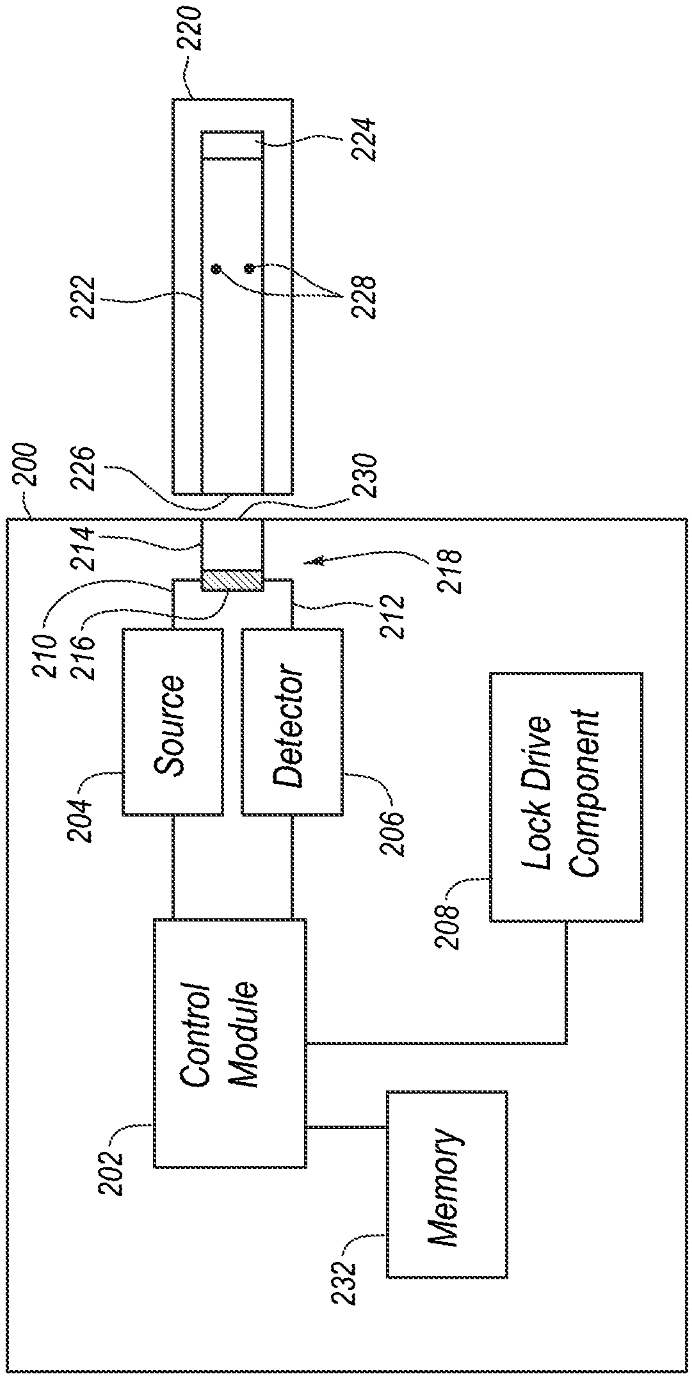
FIG. 2 shows an illustrative example of a lock system including a key that is validated using optical signals that are transmitted from a lock module to a key module.

FIG. 2 shows an illustrative example of a lock system including a key that is validated using optical signals that are transmitted from a lock module 200 to a key module 220, arranged in accordance with at least some embodiments described herein.

The lock module 200 is an example of the lock module 104 and the key module 220 is an example of the key module 108.

An example lock module 200 may include one or more of a control module 202, a source 204, a detector 206, and/or a lock drive component 208. The lock module 200 operates to determine the validity of the key 106. The control module 202 is generally configured to govern the operation of the lock module 200. The control module 202 is configured to dynamically generate instructions or signals to other components of the lock component 200. The control module 202, by way of example only, may be configured to instruct the source 204 to generate or emit optical signals, control how long the optical signals are generated, and/or read the signals generated by the detector 206. The control module 202 may also be configured to compare the data included in the signals returned by the key module 220 to determine the validity of the key 106. The control module 202 may also be configured to instruct the lock drive component 208 when to actuate the lock mechanism for engaging and/or disengaging the lock.

The optical signals generated by the source 210 can be conveyed by or travel in a waveguide 218 in the lock module 200 and by a waveguide 222 in the key module 220. For instance, signals generated by the source 204 can be conveyed by the waveguide 218 to the waveguide 222. The key module 220 can be adapted to include a reflector 224. The reflector 224 can be configured to return or reflect the signals transmitted by the source 204 back to the lock module 200 and more particularly to the detector 206. The detector 206 can be configured to detect the returned signals and the lock module 200 can be adapted to determine the validity of the key based on the detected returned signals.

In some examples, the signals generated by the source 204 are optical signals. The source 204 may include one or more light emitting diodes, semiconductor laser devices, or the like. The optical signals can be conveyed by the waveguide 218 as previously mentioned. In this example, the waveguide 218 can include an optical switch 216 or an optical router. Optical signals transmitted by the source 210 can travel over a portion 210 of the waveguide 218 to the switch 216, which can deliver the light to a portion 214 of the waveguide 218.

When the key 106 is inserted in the keyhole 112, the waveguide 218 is aligned with the waveguide 222 at an interface 230. This enables the optical signals in the waveguide 218 to be coupled to the waveguide 222 across the interface 230. Optical signals returned by the key module 220 can be routed from the portion 214 of the waveguide 218 to the portion 212 of the waveguide 218 by the switch 216. The portion 212 of the waveguide 218 can be configured to deliver the optical signals to the detector 206.

The key module 220 is configured to operate on the optical signals received from the source 204 to encode the optical signals that are returned to the lock module 200. The key module 220 is configured to encode the optical signals or otherwise operate on the optical signals. In one example, a portion of the waveguide 222 can be blocked by blocks 228. The blocks 228 are configured to prevent at least some portion of the optical signals transmitted by the source 204 from being returned to the lock module 200 or more specifically to the detector 206. Blocking some portion of the optical signals can be utilized to enable the key module 220 to encode the optical signals with a combination that can be read (e.g., detected) by the lock module 200.

In some embodiments, the blocks 228 may include holes formed in the key 106. The holes can be configured to interrupt some portion of the optical signals. The holes can be sized such that at least some of the optical signals are scattered and are not returned to the detector 206. In addition, the waveguide 22 may include multiple optical paths. Typically, each of the blocks 228 or holes can be arranged to interrupt one of the optical paths. In an example, there may be more optical paths than blocks 228 or holes to ensure that at least some of the optical signals are returned by the key 106 to the detector 206.

More specifically, the control module 202 can be configured to read (e.g., detect) the optical signals detected by the detector 206 and determine whether the key is valid. For instance, the control module 202 may be adapted to compare a combination encoded in the optical signals by the key module 220 with a combination stored in a memory 232. The combination can be prestored in the memory 232, although in some examples the lock 102 can be reconfigured to accept a new combination. When the combination encoded by the key module 220 is determined to match the combination stored in the memory 232, the key is determined to be valid. When the key is valid, the control module 202 can generate a signal to operate the lock drive component 208, which opens or closes (engages or disengages) the lock.

In some instances, the memory 232 may be configured to store multiple combinations for multiple keys. For example, the lock module 200 may be adapted to control access to multiple doors, where each door may have a corresponding combination, and each combination that is stored in the memory 232 may be associated with different instructions. The instructions, for example, may identify which doors a particular key may open after validity of the key is determined. As a result, different keys may be utilized to open different doors or provide access to different locations using the same lock module 200 or a series of interconnected lock modules.

When the control module 202 detects a valid key, the control module 202 generates commands according to the instructions associated with the combination generated by the valid key. In one example, a security system may be implemented using multiple lock systems. Keys distributed to various users can be utilized to enable those users to access areas where their keys are determined to be valid.

The detector 206 may include one or more photodetectors that are configured to generate an output in response to detected signals (e.g. detected optical energy). The output of the photodetectors can be monitored by the control module 202, which can be configured to identify the combination encoded in the returned signal. For example, the detection of an optical signal may result in a current or voltage that can be interpreted as a detected optical signal by the control module 202.

The control module 202 can also control the source 204. The control module 202, for example, may be configured to detect insertion of the key. A trigger inside the keyhole 112 may be depressed when the key 106 is inserted to activate the lock module 200. Insertion of the key may therefore generate a signal that can cause the control module 202 to generate a command to the source 204. The source can emit optical signals into the waveguide 218 in response to the command received from the control module 202. The source 204 may include one or more light emitting sources.

Figure 3:
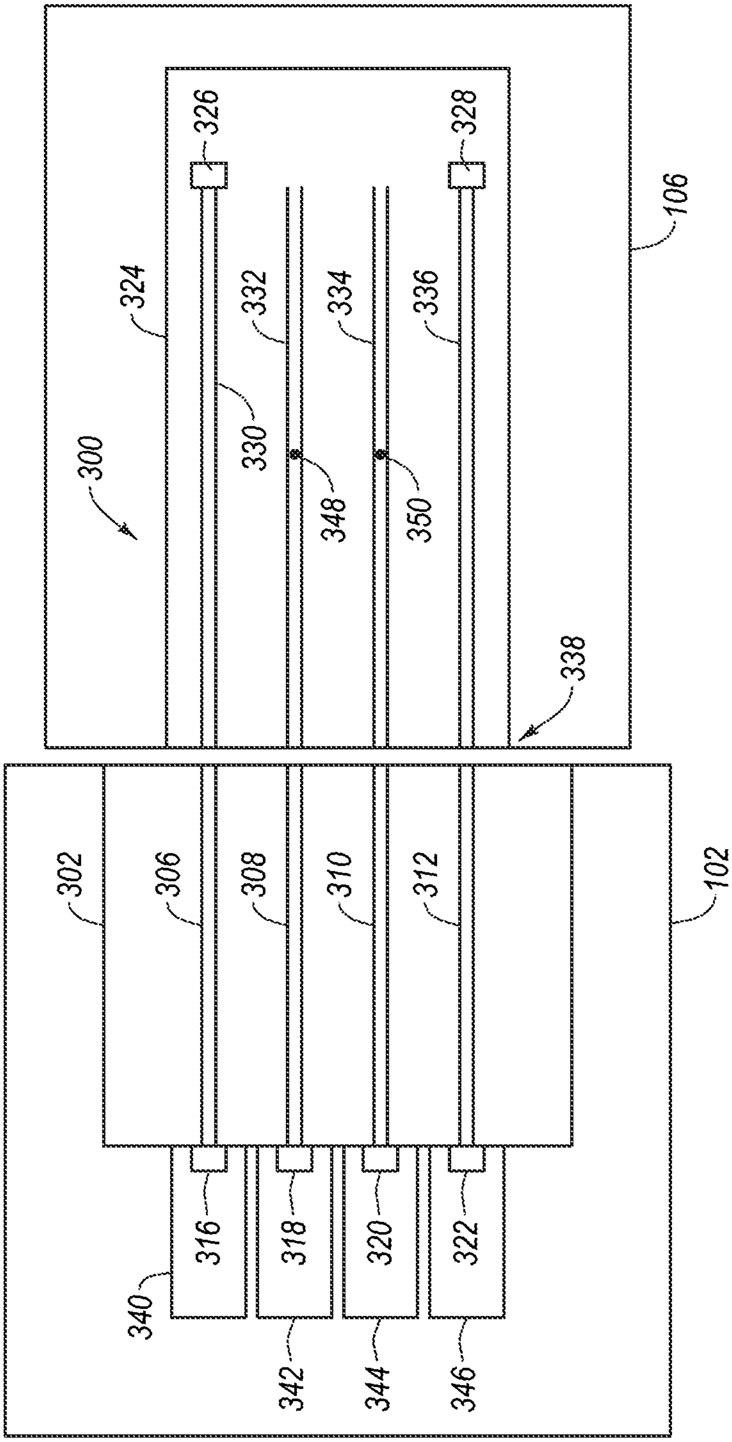
FIG. 3 shows an illustrative example of the optical communication occurring between the lock and the key during validation of the key.

FIG. 3 shows an illustrative example of the communication between the lock 102 and the key 106, arranged in accordance with at least some embodiments described herein. FIG. 3 illustrates a waveguide 302, which is an example of the waveguide 218. FIG. 3 also illustrates a waveguide 324, which is an example of the waveguide 222. The waveguide 302 may include a plurality of optical paths, illustrated as paths 306, 308, 310, and 312. The key 106 includes optical paths 330, 332, 334, and 336 in the waveguide 324. The optical paths may also be referred to as waveguides.

In another example, a single waveguide or optical path can be used for the optical signals. In this example, the lock system may be configured to detect a difference between a key with an optical path and a key without an optical path. The key with the optical path can be validated as valid, while the key without the optical path cannot be validated.

When the key 106 is inserted in the lock 102, the paths 306, 308, 310, and 312 can be configured in alignment, respectively, with the paths 330, 332, 334, and 336. More specifically, an interface 338 between the waveguide 302 and the waveguide 324 is configured such that the optical signals can traverse (or couple through) the interface 338 without too much dispersion or optical loss. In addition, the interface 338 can be configured such that light returned to the detectors 316, 318, 320, and 322 can be detected after traversing (or coupling through) the interface 338 a second time.

For example, the source 340 can be configured to emit an optical signal (e.g., light at a certain wavelength) that is emitted along path 306. The optical signal exits the path 306 at the interface 338 and is coupled to the path 330. The optical signal is then reflected by the reflective element 326, such as a mirror, a semiconductor mirror, or the like, and returned along path 330. The optical signal returned by the key 106 then exits the path 330 at the interface 338 and is coupled to path 306. The detector 316 then detects the returned or reflected optical signal. The detected optical signal may be converted to a digital signal (or in other examples an analog signal) by the detector 316, which can be coupled to the control module 202. In a similar manner, the control module 202 can also be configured to receive signals from the detectors 318, 320, and 322.

In this example, the path 332 can be configured to prevent or substantially prevent optical signals from being detected by the detector 318. Although an optical signal may be emitted by the source 342, the block 348 (which may be a hole in the key 106 in one example) prevents the light from being returned to the detector 318. The block 348 may include a hole (which causes the optical signal to be dispersed or scattered) formed in the path 332, a light absorbing material, or the like. In addition, the block 348 may be formed by omitting a reflective element at an end of the path 332. The hole may be configured to pass through the optical path or be placed at a proximal end of the key such that the light traveling in the path 332 may exit the end of the key opposite the end adjacent the lock.

By blocking at least some (or none or all) of the optical paths in the waveguide 324, the key 106 can be configured to encode the optical signals emitted by the sources 340, 342, 344, and 346 with a combination. In this example, the control module is configured to determine that the detectors 316 and 322 have detected optical signals. The detectors 318 and 320 do not detect optical signals because the blocks 348 and 350 prevent the optical signals from returning to the lock 102.

The validation of the key 106 may utilize multiple optical paths. FIG. 3 illustrates a four bit combination. Because the paths 332 and 334 are blocked by the blocks 348 and 350, the combination of the key 102 can be interpreted as "1001". The blocks 348 and 350, when configured as holes, are configured to scatter the corresponding optical signals such that the corresponding optical signals are not returned to the detectors. As a result, the key 106 effectively encodes the combination in the optical signals.

For example, the detectors 316, 318, 320, and 322 detect light and generate a "1001" signal that can be coupled to the control module 202. In this case, the detectors 316 and 322 are configured to detect an optical signal and generate a signal that is interpreted by the control module 202 as a logical value of "1". The detectors 318 and 320 do not detect an optical signal (e.g., because the blocks 348 and 350 or holes scattered the corresponding optical signals in the optical paths 332 and 334) and the output of the detectors 318 and 320 is interpreted by the control module 202 as a logical value of "0". The control module 202 thus interprets a combination of "1001". If this combination matches a combination stored in the memory 232, then the key 106 can be validated and the lock can be operated.

The number of paths in the waveguide 324 can vary. A larger number of paths can make the combination more complex. Each additional path can be utilized to increase the potential number of combinations exponentially. In one example, the paths may be formed of optical fibers.

The transmission of an optical signal may be described with reference to the optical path 330. In the optical path 330, the light emitted from the light source (e.g., the source 204) travels in the optical path 330 and is reflected by the reflective element 326 (e.g., a mirror). The light travels back to the detector 206 bumping the internal walls of the optical path 330 (internal reflection within the optical path 330). As a result, the light reaches the detector 206 unless there is a hole or other block to interrupt the light. In the disclosure, the angle of the reflective element 326 is set at around 45 degrees, so that the light is reflected toward the detector/source. The angle can, however, be any angle that allows the light to be successfully reflected back toward the detector 206.

An optical strength of the optical signals may be set according to a size of the lock and/or the key as well as on the source used to generate the optical signals. The optical strength can be varied. A number of optical paths in the waveguide 324 can vary. A larger number of optical paths can be utilized to increase the security. A length of the optical paths 330, 332, 334, and/or 336 can vary. The length could be the same length of the key or any appropriate length as long as the optical signals can be reflected at least once.

In another embodiment, a complexity of the key 106 can be increased by including wavelength dependent reflective elements in the key 106. In this example, a particular optical signal can be reflected when the optical signal is within a particular wavelength range. Thus, the combination becomes dependent on being reflected and by being within a particular wavelength range. The control module 202 can be adapted to determine that a key is invalid, for example, when an optical signal that should be reflected is not reflected because the key 106 includes the wrong reflectors or the wrong materials.

In another example, the paths 330, 332, 334, and/or 336 may be transparent to certain frequencies (or wavelengths) of light or other electromagnetic radiation. This increases the number of potential combinations, particularly when the sources 340, 342, 344, and 346 can be selected to emit different frequencies (wavelengths). Since the complexity of the lock system may be increased with multi-frequency emission, it may be difficult to ascertain the properties of the optical paths embedded in the key. The security can thus be enhanced when the sources 316, 318, 320, and 322 are selected to generate specific wavelengths or specific ranges of wavelengths.

Figure 4:
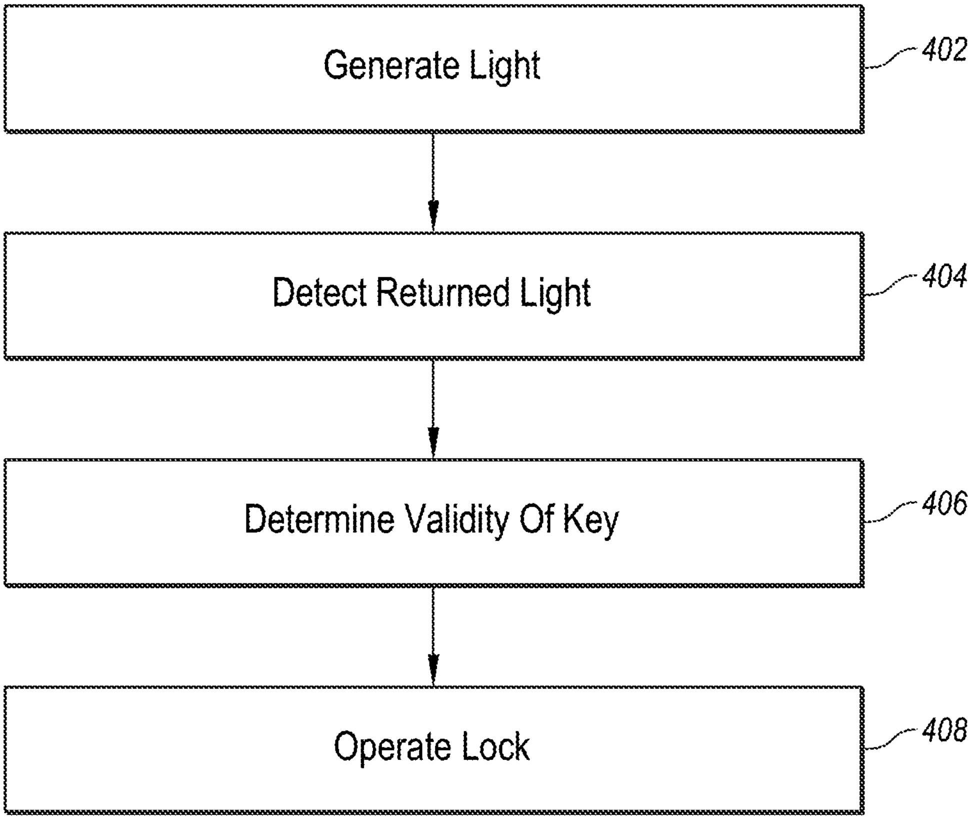
FIG. 4 shows an illustrative method for validating a key in a lock system, all arranged in accordance with at least some embodiments described herein.
Figure 4:
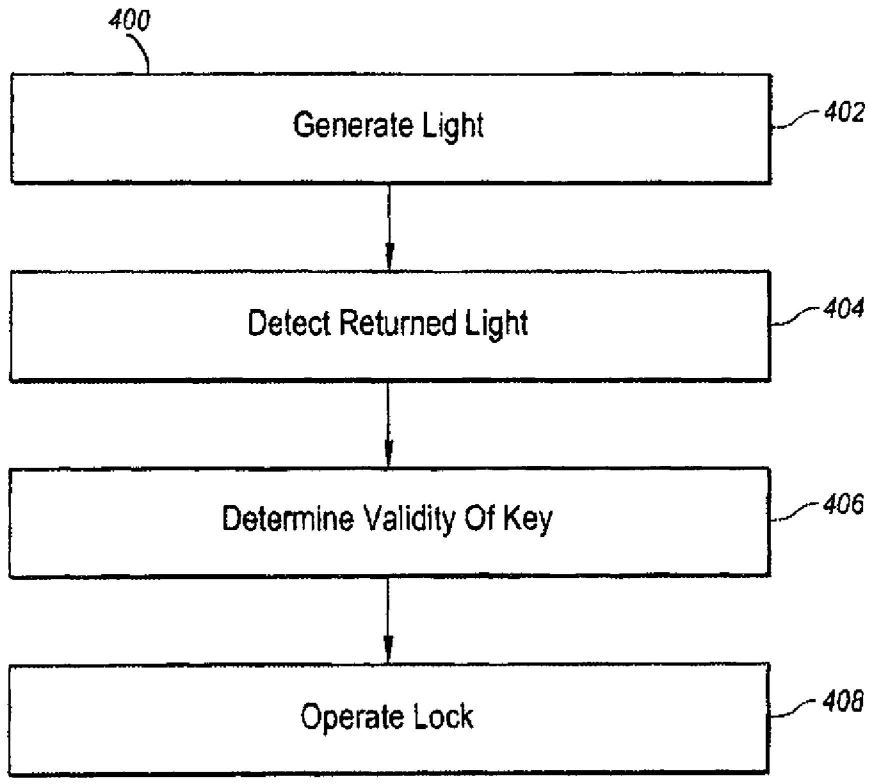

FIG. 4 shows an example method 400 for validating a key in a lock system, arranged in accordance with at least some embodiments described herein. Method 400 includes various operations, functions, or actions as illustrated by one or more of blocks 402, 404, 406, and/or 408. Method 400 may begin at block 402.

In block 402 ("Generate Light"), the method generates light or optical signals. A source (e.g., the source 202 in the lock module 200 in FIG. 2) generates light. The light (which may include multiple distinct optical signals having the same or different wavelengths) may include multiple light emitters. The generation of the light often occurs in response to the insertion of a key in a lock. The light generated in the lock by the source can be transmitted to the inserted key by a waveguide, which reflects or returns at least some portion of the light back to the lock. Block 402 may be followed by block 404.

In block 404 ("Detect Returned Light"), the method detects returned light or returned optical signals. A detector detects returned light. More specifically, a detector such as the detector 206 in the lock module 200 detects light returned by the key. As previously stated, the key typically includes reflective elements and/or blocks that are configured to return at least some of the light back to the lock. When the light is transmitted using multiple paths (e.g., in a waveguide that includes multiple optical paths), some of the paths may be blocked in the key. By reflecting some portion of the light, the key is able to encode the light with a combination or other data. When the light is detected, one or more signals are generated in response to the detected light by the detector. The generated signals correspond to the combination of the key. Block 404 may be followed by block 406.

In block 406 ("Determine Validity of Key"), the method determines a validity of a key. A control module may determine a validity of the key. The validity of the key can be confirmed when the combination received from the key matches a predetermined combination that is stored in memory of the lock. The key is determined to be invalid if the combination of the key does not match the combination stored in the lock.

In some examples, the key may be read one or more times in order to account for potential glitches, improper positioning of the key in the lock, and the like. The control module of the lock may have other mechanisms in place to prevent an invalid key from being recognized as valid while attempting to account for user problems. For instance, the key may be read three times before the lock is shut down for a period of time. Block 406 may be followed by block 408.

In block 408 ("Operate Lock"), the method operates the lock. The lock can be operated when the key is determined to be valid. When the key is determined to by valid, the control module may issue instructions to operate a locking drive component to open or close the lock When the lock is closed, for instance, the control module issues instructions to open the lock. When the lock is open, the control module issues instructions to close the lock.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A lock system comprising:

a lock that includes a lock module configured to control a lock mechanism, the lock module comprising:

a first waveguide that includes a plurality of first optical paths;

a source that is configured to transmit optical signals through the first optical paths of the first waveguide to a key, wherein the key comprises a key module that includes a second waveguide, and wherein the second waveguide includes a plurality of second optical paths;

a detector configured to detect encoded optical signals returned from the key and transmitted through at least some of the plurality of second optical paths and at least some of the plurality of first optical paths; and a control module, wherein the control module is configured to read the encoded optical signals detected by the detector and to determine whether the key is valid, wherein the control module is also configured to actuate the lock mechanism when the key is determined to be valid;

wherein at least some of the second optical paths each include a reflective element configured to return the optical signals back to the lock module and wherein at least some of the second optical paths are blocked such that optical signals in the blocked optical paths are not returned to the lock module.

2. The lock system of claim 1, wherein the detector comprises a plurality of photodetectors and the source comprises a plurality of emitters, wherein the plurality of emitters are configured to transmit the optical signals and the plurality of photodetectors are configured to detect the encoded optical signals.

3. The lock system of claim 2, wherein the plurality of emitters are configured to emit light at different wavelengths.

4. The lock system of claim 1, wherein the key module is configured to encode the optical signals by preventing at least some portion of the optical signals from being returned to the lock module, wherein the optical signals are transmitted from the first waveguide to the second waveguide across an interface between the key and the lock and wherein the encoded optical signals are coupled through the interface from the second waveguide to the first waveguide.

5. The lock system of claim 1, wherein the encoded optical signals are encoded with a combination, wherein the control module is configured to compare the combination with a predetermined combination stored in a memory of the lock module to determine the validity of the key.

6. The lock system of claim 1, wherein the reflective element comprises a mirror positioned at an end of at least some of the second optical paths and wherein blocks in the second optical paths include one of holes or a light absorbing material.

7. The lock system of claim 1, wherein the lock comprises a keyhole having a first structure and wherein an end of the key includes a complementary structure adapted to ensure that the key is correctly oriented when inserted into the keyhole.

8. The lock system of claim 1, wherein each of the blocked optical paths comprises a block configured to prevent light from being returned to the lock module.

9. The lock system of claim 8, wherein each block comprises a hole configured to disperse or scatter a corresponding one of the optical signals.

10. The lock system of claim 8, wherein each block comprises a light absorbing material.

11. A lock system comprising:

a lock paired with a key;

the lock including:

a first waveguide;

a source positioned to emit optical signals toward the key through the first waveguide when the key is engaged with the lock, wherein the source includes a plurality of emitters and each of the plurality of emitters is arranged to emit an optical signal into a corresponding first optical path included in the first waveguide;

a detector arranged to receive encoded optical signals returned from the key, wherein the key encodes the optical signals emitted by the source with a combination, wherein the detector includes a plurality of photodetectors; and a control module coupled to a lock drive component that is configured to selectively engage or disengage a locking mechanism, wherein the control module is configured to generate an instruction to actuate the locking mechanism when the control module determines that the combination is valid for the lock; and the key including:

a second waveguide, wherein the optical signals emitted by the source are coupled to the second waveguide from the first waveguide, wherein the second waveguide is configured to reflect at least a portion of the optical signals back towards the detector through the second waveguide and the first waveguide;

wherein the second waveguide includes a plurality of optical paths and wherein at least one of the plurality of optical paths is configured to suppress reflection of a corresponding optical signal in the at least one of the plurality of optical paths; and wherein at least some of the plurality of optical paths each include a mirror positioned within the corresponding optical path, wherein the mirrors are configured to reflect the optical signals emitted from the source back through the second waveguide and the first waveguide to the detector.

12. The lock system of claim 11, wherein the plurality of optical paths of the second waveguide comprise a plurality of second optical paths, wherein the first waveguide is positioned so as to permit alignment of the first optical paths and the second optical paths, wherein the first optical paths are configured to deliver optical signals emitted from the source to the second optical paths, and wherein the first optical paths are configured to deliver the encoded optical signals received from the second optical paths to the detector.

13. The lock system of claim 11, wherein the control module is configured to determine whether the key is valid by comparing the combination in the encoded optical signals with a prestored combination that is stored in a memory.

14. The lock system of claim 11, wherein the at least one of the plurality of optical paths configured to suppress reflection of the corresponding optical signal comprises a block that includes a hole configured to disperse or scatter the corresponding optical signal.

15. The lock system of claim 11, wherein the at least one of the plurality of optical paths configured to suppress reflection of the corresponding optical signal comprises a block that includes a light absorbing material.

16. A method of actuating a lock mechanism in a lock system, the method comprising:

emitting optical signals from a plurality of emitters included in a lock module into a plurality of waveguides, one or more of the plurality of waveguides including a reflective element positioned therein and one or more of the plurality of waveguides including a feature configured to substantially prevent one or more of the optical signals from being reflected;

receiving reflected optical signals at a plurality of detectors, wherein the reflected optical signals include a combination;

determining that a key is valid in response to verification of the combination; and actuating the lock mechanism in response to determining that the key is valid.

17. The method of claim 16, wherein actuating the lock mechanism comprises generating an instruction to a lock drive component that is configured to drive the lock mechanism in response to verification of the combination.

18. The method of claim 16, wherein the plurality of waveguides include a first waveguide positioned in the lock module and a second waveguide positioned in the key, and wherein the first waveguide and the second waveguide each include an optical path for each of the optical signals.

19. The method of claim 16, further comprising detecting insertion of the key into the lock.

20. The method of claim 16, further comprising reconfiguring the combination of the lock and pairing the lock with a different key.

* * * * *

UNITED STATES PATENT AND TRADEMARK OFFICE

CERTIFICATE OF CORRECTION

PATENT NO. : 8,866,066 B2
APPLICATION NO. : 13/062496
DATED : October 21, 2014
INVENTOR(S) : Fuse It is certified that error appears in the above-identified patent and that said Letters Patent is hereby corrected as shown below:

In the Drawings

In Fig. 4, Sheet 4 of 4, insert Main Designator -- 400 --. (As shown on Attached Sheet)

In the Specification

In Column 1, line 5 below Title, insert -- CROSS-REFERENCE TO RELATED APPLICATION The present application is a U.S. national stage filing under 35 U.S.C. §371 of International Application No. PCT/US2010/053399, filed on Oct. 20, 2010. --.

In Column 3, Line 32, delete “lock 106” and insert -- lock 102 --, therefor.

In Column 4, Line 5, delete “key module 106” and insert -- key module 108 --, therefor.

In Column 5, Line 28, delete “portion 210” and insert -- portion 214 --, therefor.

In Column 7, Line 48, delete “key 102” and insert -- key 106 --, therefor.

In Column 8, Line 58, delete “source 202” and insert -- source 204 --, therefor.

In Column 9, Line 37, delete “lock When” and insert -- lock. When --, therefor.

In Column 10, Line 47, delete “and or” and insert -- and/or --, therefor.

Signed and Sealed this
Ninth Day of June, 2015

Michelle K. Lee
*Director of the United States Patent and Trademark Office*